(12) United States Patent
Stewart et al.

(10) Patent No.: US 6,651,500 B2
(45) Date of Patent: *Nov. 25, 2003

(54) MICROMACHINED SILICON TUNED COUNTERBALANCED ACCELEROMETER-GYRO WITH QUADRATURE NULLING

(75) Inventors: Robert E. Stewart, Woodland Hills, CA (US); Stanley F. Wyse, Encino, CA (US)

(73) Assignee: Litton Systems, Inc., Woodland Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/971,345

(22) Filed: Oct. 3, 2001

(65) Prior Publication Data

US 2003/0061877 A1 Apr. 3, 2003

(51) Int. Cl.[7] .................................................. G01C 19/00
(52) U.S. Cl. ....................................... 73/511; 73/504.04
(58) Field of Search ...................... 73/510, 511, 504.03, 73/504.04, 514.01, 514.02, 514.15, 514.29, 504.12, 504.02

(56) References Cited

U.S. PATENT DOCUMENTS 6,474,160 B1 * 11/2002 Stewart et al. ........... 73/504.04

* cited by examiner

*Primary Examiner*—Helen Kwok

(57) ABSTRACT

An integrated rate and accelerometer sensor includes two counter vibrating tuned accelerometers formed in a single substantially planar silicon body to form the sensing element. The two vibrating accelerometers are interleaved in a manner that places their respective centers of mass in the same line parallel to the direction of the vibration and has the centers of percussion of the two (pendulum) proof masses coincident. A phase insensitive quadrature nulling method is utilized for each of the two vibrating accelerometers. The sensor structure utilizes Pyrex for the top and bottom covers. Metalized electrodes, feedthrus and contact pads are also utilized for the sensing element, instead of interlayer wire bonds.

29 Claims, 5 Drawing Sheets

MICROMACHINED SILICON TUNED COUNTERBALANCED ACCELEROMETER-GYRO WITH QUADRATURE NULLING

BACKGROUND OF THE INVENTION

1. Field of the Invention

The present invention relates to an inertial instrument and more specifically pertains to single axis and multi-axis vibrating accelerometers used as multi-sensors for measuring linear acceleration and rate of rotation of a moving body.

2. Description of Prior Art

Gyroscopes and accelerometers are well known for use in sensing angular velocity and acceleration for determining location, direction, position and velocity of a moving vehicle.

A desire for miniaturization, reduced cost, and improved performance requires almost impossible accuracies in the actual structure of the accelerometer.

SUMMARY OF THE INVENTION

Two counter vibrating tuned accelerometers are formed in a single substantially planar silicon body to form the sense layer of the accelerometer gyro. The two accelerometers each having a dither mass (driven element) and proof mass (pendulum) are structurally interleaved in a manner that places the center of mass of the two accelerometers on a line parallel to the direction of vibration, and places the centers of percussion of the two proof masses at the same spot. Each accelerometer is subjected to a phase insensitive quadrature nulling method. A top and bottom cover for the sense layer is made of Pyrex, and uses metalized electrodes, contact pads, and vias to access and contain the sense layer. A container encapsulates the accelerometer package in a hermetically sealed environment. Access to the accelerometer is provided by feedthrus in the container walls

BRIEF DESCRIPTION OF THE DRAWINGS

The exact nature of this invention as well as its objects and advantages will become readily apparent from consideration of the following specification in relation to the accompanying drawings in which like reference numerals designate like parts throughout the figures thereof and wherein.

DESCRIPTION OF THE PREFERRED EMBODIMENT

The silicon accelerometer-gyro of the present invention is based on the sensing and measuring of coriolis induced accelerations acting on a vibrating accelerometer undergoing rotation, as a means for measuring angular rotation rates.

Figure 1:
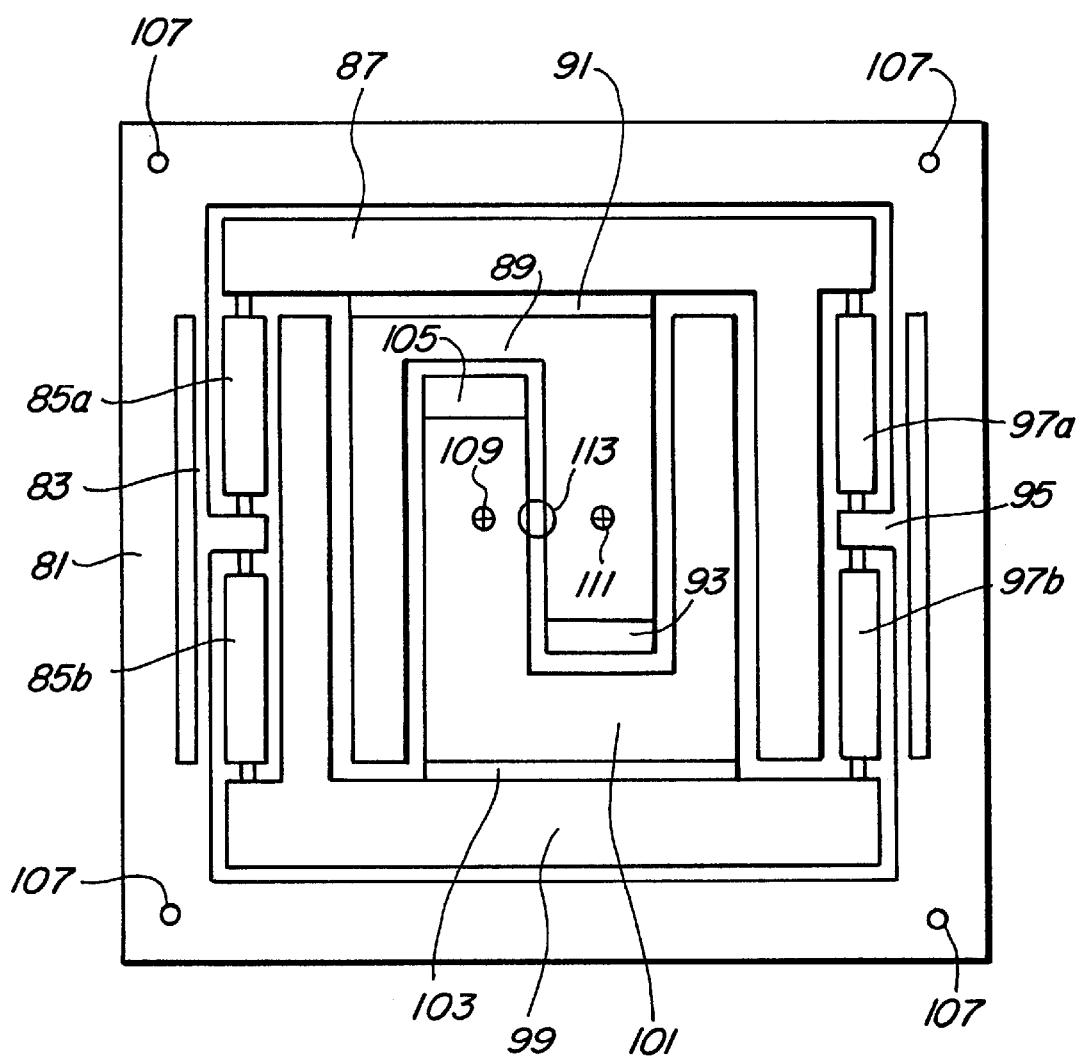
FIG. 1 is a top plan view of a sensing layer, having driven elements of an accelerometer structure according to the present invention.
Figure 2:
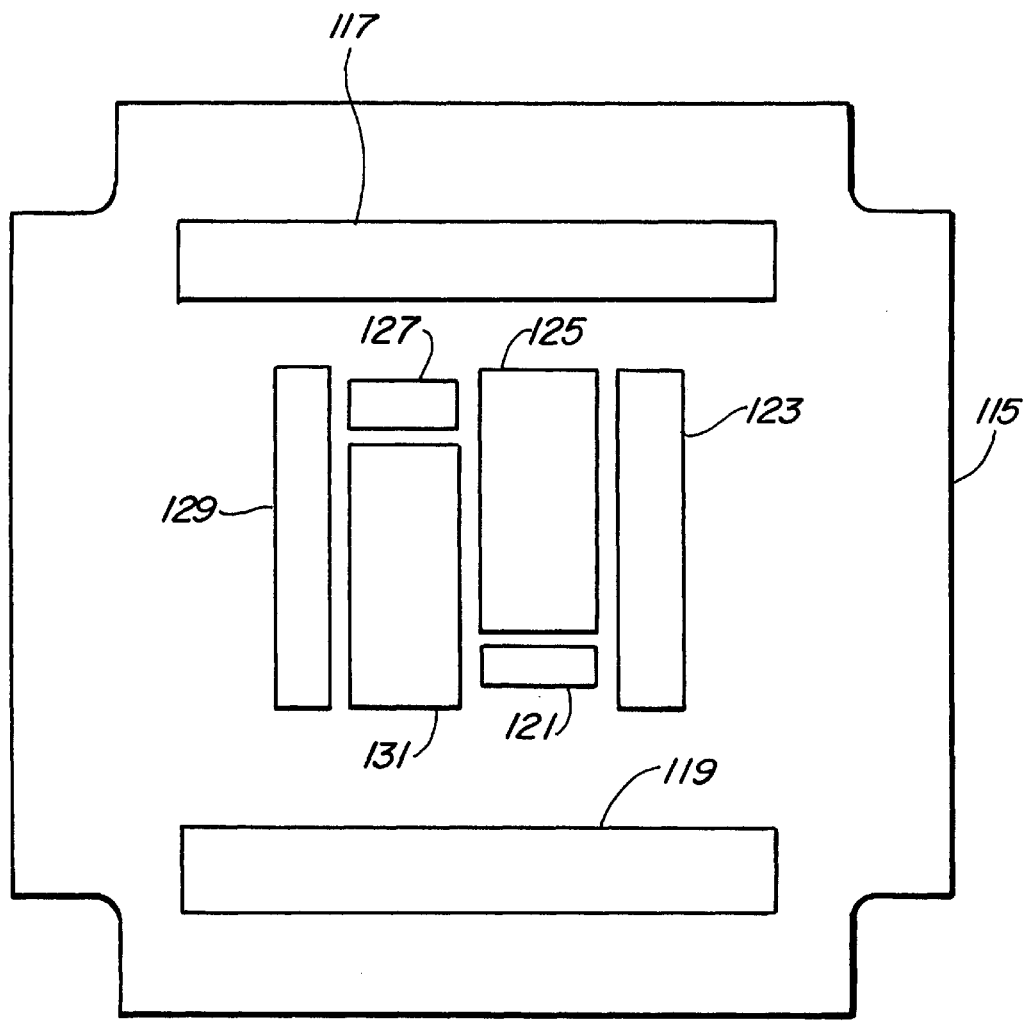
FIG. 2 is a bottom plan view of the top and bottom cover for the sensing layer of FIG. 1, showing the driver, forcer, and tuning structure.
Figure 3:
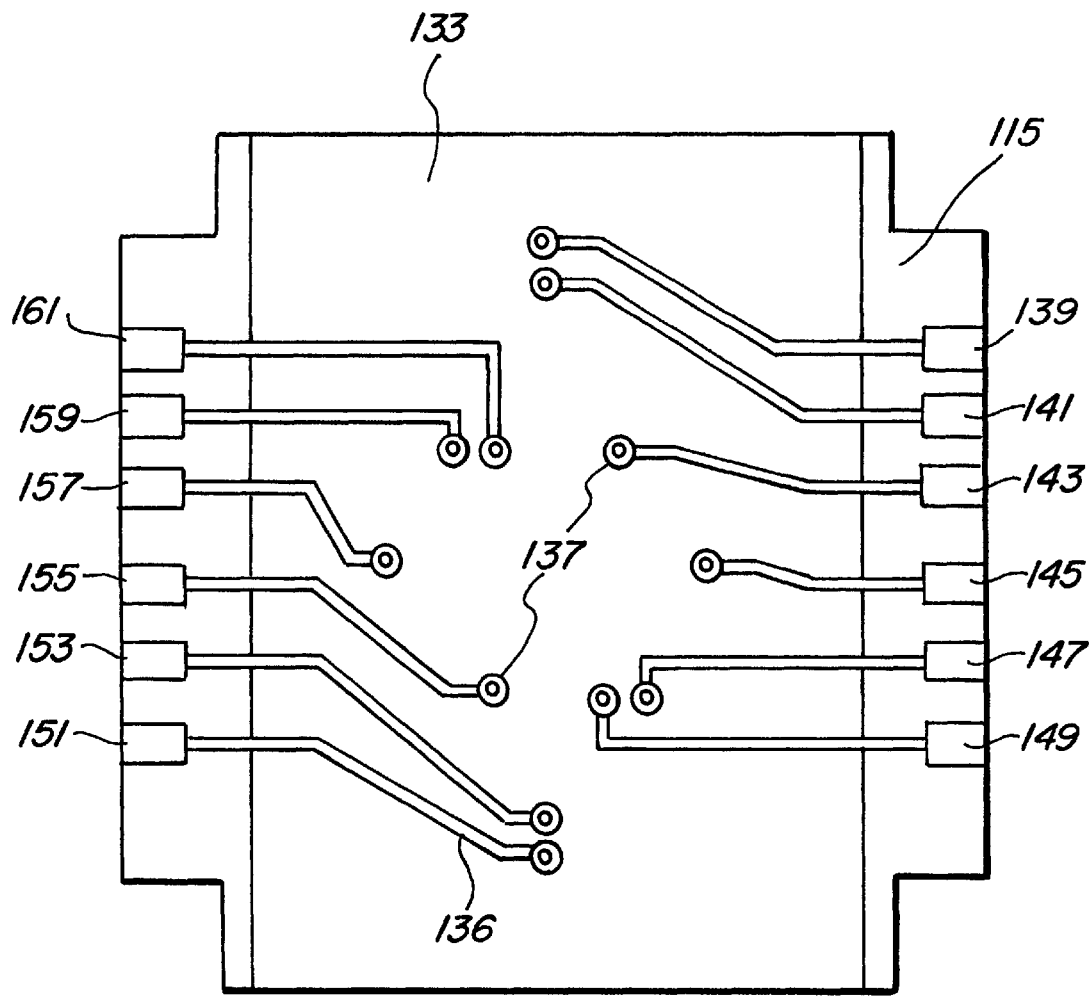
FIG. 3 is a top plan view of the top and bottom cover of FIG. 2 showing the contact pads, conductive paths and vias.

The accelerometer consists of a driver and sensing element (FIG. 1), and driver, forcer, and tuning electrodes in a top and bottom cover (FIGS. 2 and 3).

FIG. 1 illustrates the central sensing layer of the accelerometer gyro of the present invention which is micromachined out of single crystal silicon wafers. The sensing layer has a frame 81 containing a pair of counter-vibrating accelerometers. The first accelerometer consists of a first dither mass 87 and a first proof mass 89 attached to the dither mass 87 by a flexure 91. The second accelerometer consists of a second driven or dither mass 99 and a second proof mass 101 attached to dither mass 99 by a flexure 103.

A first dither coupling spring 83 couples a pair of first dither suspension springs 85a and 85b to the frame 81. A second dither coupling spring 95 attaches another pair of dither suspension springs 97a and 97b to the frame. Dither suspension springs 85a and 97a support the first dither mass 87. Dither suspension springs 85b and 97b support the second dither mass 99.

The entire sensing layer of FIG. 1 is fabricated from single crystal silicon wafers having a thickness that is sufficient to provide high, out of plane, stiffness and structural resonances well above the dither frequencies and tuned proof mass (pendulum) frequencies of the accelerometer gyro.

Each of the two counter vibrating tuned accelerometers have a like shape that includes an L-shaped driven or dither mass 87, 99, a proof mass 89, 101 with respective quadrature null regions 93 and 105. A flexure 103 and 91 joins the proof masses 101 and 89 to their respective dither masses 99 and 87. These two counter-vibrating accelerometers have an interdigitated structure in that dither mass 87 is L-shaped with a first leg of the L lying along the length of frame 81 and a second leg of the L lying along the width. The second dither mass 99 is also L shaped with the first leg of the L lying along the length of the frame and the second leg lying along the width of the frame, on the sides opposite to the first dither mass 87. The proof masses 101 and 89 are both U-shaped, with the arms of the U for each proof mass interleaved.

As a result of this interleaved, interdigitated structure, the centers of percussion of the two proof masses 89 and 101 coincide at a single point 113. In addition, the center of masses of the two vibrating structures made up of the respective dither and proof mass lie on a line parallel to the dither axis. That is center of mass 111 for accelerometer 87, 89 and center of mass 109 for accelerometer 99, 101 lie in a line that is parallel to the direction of vibration, which is in the plane of the paper of FIG. 3.

The two interdigitated structures are driven electrostatically out of phase by voltages that are applied to dither driver electrodes 117 and 119 (FIG. 2). Dither mass 87 is driven by dither drive electrode 117. Dither mass 99 is driven by dither drive electrode 119. Both electrodes are located on the bottom side of a top cover and bottom cover for the center sensing layer, as illustrated in FIG. 2. Both the top and bottom cover have the same structure. The driven elements 87 and 99 shown in FIG. 1 and the dither driver elements 117 and 119 of FIG. 2 are of the variable area type which provides a linear displacement resulting from a linear force.

Besides the dither drive electrodes, the bottom side of the top and bottom covers of FIG. 2 contain tuning electrodes 123 and 129 which are utilized to adjust the natural frequency of the proof masses 101 and 89 to be the same as the dither frequency. This is preferably accomplished in a manner as described in U.S. patent application Ser. No. 09/778, 434 for Micromachined Silicon Gyro Using Tuned Accelerometer by Robert E. Stewart filed on Feb. 7, 2001, one of the inventors of the present application, both applications being owned by the same assignee. The entire specification and drawings of application U.S. Ser. No. 09/778,434 are incorporated herein by reference.

The bottom side of the top and bottom covers illustrated in FIG. 2 also have quadrature forcer electrodes 127 and 121 which operate in conjunction with quadrature null area 105 on proof mass 101 and quadrature null area 93 on proof mass 89. The operation and purpose of these elements are fully described in U.S. patent application Ser. No. 09/915,026 for Phase Insensitive Quadrature Nulling Method And Apparatus For Coriolis Angular Rate Sensors filed on Jul. 25, 2001, by Robert E. Stewart and Stanley F. Wyse, the same inventors as in the present application, both applications being commonly owned by the same assignee. The entire specification and drawings of application U.S. Ser. No. 09/915, 026 are incorporated herein by reference. The purpose of these quadrature forcer electrodes and quadrature null areas is to electrostatically servo the dither drive acceleration induced forces on the proof masses to null using phase insensitive control as described in application U.S. Ser. No. 09/915,026.

Referring now to FIG. 3, the top side of the top and bottom covers 115 is illustrated. FIG. 2 illustrates the bottom side of the top and bottom covers. These covers are preferably made out of Pyrex with metalized electrodes such as 127, 129 and 131 on the bottom sides (FIG. 2) with feedthru vias, such as 137 (FIG. 3) and contact pads 135 (FIG. 3) on the top side. Use of Pyrex for the covers reduces stray capacitance and improves performance while potentially reducing recurring cost because of reduced material and etch time cost. Moreover, utilizing this scheme has a potential of simplifying the wire bonding into a housing or rigidflex mounting. The top of the cover plate 115 shown in FIG. 5 has a plurality of contact pads 139, 141, 143, 145, 147, and 149 on one side and a plurality of contact pads 161, 159, 157, 155, 153, and 151 on the other side which are connected by way of conductive paths 136 to respective feedthru vias 137.

Electrode signals from the underside of the cover 115 are routed by way of the feedthru vias 137 to the contact pads 135 on the edges of the top and bottom covers 115. Thus, contact pads 139 and 141 are dedicated to signals for dither driver electrode 117 on the bottom side of cover 115. Contact pad 143 is dedicated to signals for Coriolis forcer electrode 125 on the bottom side of cover 115. Contact pad 145 is dedicated to the signals for tuning electrode 123 on the bottom side of cover 115. Contact pads 147 and 149 are dedicated to quadrature forcer electrode 121 on the bottom side of cover 115. On the opposite edge of cover 115, contact pads 161 and 159 are dedicated to the signals for quadrature forcer electrode 127. Contact pad 157 is dedicated to signals from tuning electrode 129. Contact pad 155 is dedicated to Coriolis forcer electrode 131. Contact pads 153 and 151 are dedicated to dither drive electrode 119 on the under side of cover 115.

The center sensing layer shown in FIG. 3 has four ohmic contacts 107 deposited in the corners of the frame 81 to enable the application of a bias voltage to the sensor layer as required to operate the dither mass quadrature tuning and Coriolis forcers.

Figure 4:
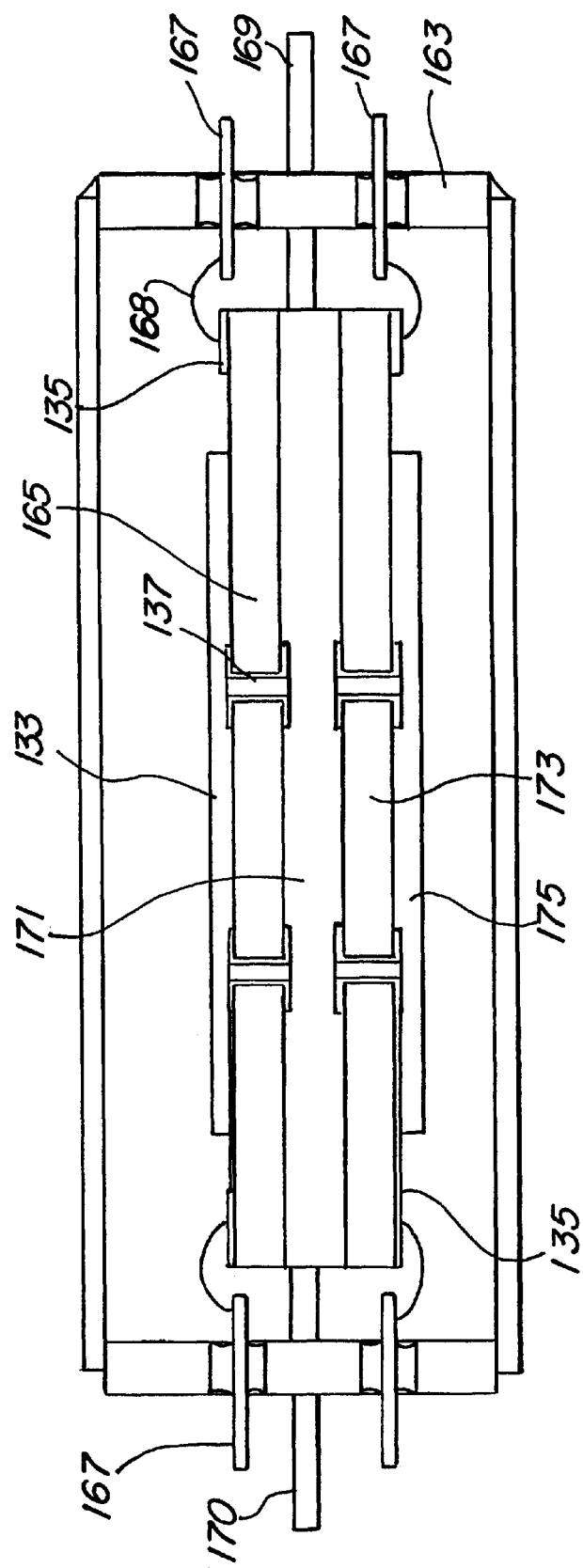
FIG. 4 is a side cross-section showing the top and bottom covers of FIGS. 2 and 3 assembled with the sensing layer of FIG. 1 contained inside a hermetically sealed container.
Figure 5:
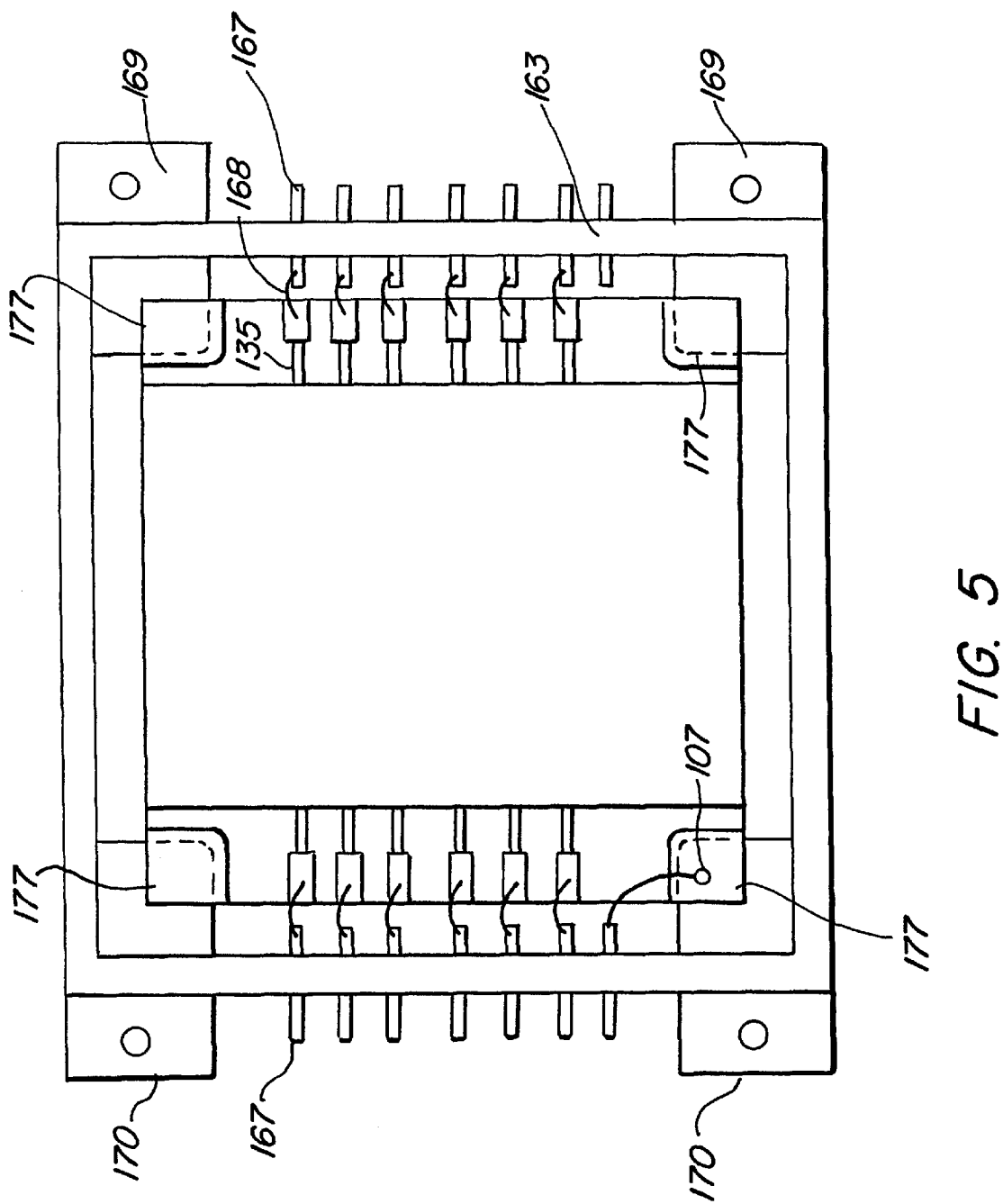
FIG. 5 is a top plan view of the structure shown in FIG. 4.

FIGS. 6 and 7 illustrate the mounting of the sensor which consists of the sensing layer of FIG. 3 and a top and bottom of FIGS. 4 and 5. The top cover is identical to the bottom cover, as shown in FIGS. 4 and 5, the top cover shown in FIGS. 4 and 5 being identical to the bottom cover as shown in FIGS. 4 and 5. FIGS. 6 and 7 show the sensor mounted in a housing 163. FIG. 7 show the sensor supported in the housing by compliant elastomeric pads 177 holding the four corners of the silicon sensing element. As can be seen, the signals from the edge contact pads 135 on the sensor are directed by wire bonds 168 to hermetic feedthrus 167 which pass through the housing walls 163. Mounting flanges 169 and 170 on the exterior of the walls of housing 163 mount the entire unit to a platform.

FIG. 6 illustrates that the feedthru vias 137 on the top cover 165 are covered by a plate 133 that is frit sealed to the top cover. Likewise, a bottom cover plate 175 covers the feedthru vias on the bottom cover and is frit sealed to the bottom cover.

As a result of the structure described herein, that is the use of two counter-vibrating tuned accelerometers in a single silicon sensing layer, where the centers of percussion of the two tuned proof masses are coincident at a single point and the centers of masses of the two vibrating structures lie on a line parallel to the direction of vibration, significant advantages are realized. The coincidence of the centers of percussion of the two proof masses ensures that there is no sensitivity to angular vibration and the sensitivity to linear vibration is common mode rejected. Incorporation of a phase insensitive quadrature nulling method eliminates the requirement for remodulation of the quadrature feedback signal and its associated phase stability requirements. Moreover, it reduces the verticality of the etch requirement for the dither springs. Arranging both sensing elements into one plane eliminates the interlayer wire bonds which are expensive and may be susceptible to manufacturing error.

What is claimed is:

1. A combined angular rate and acceleration sensor formed from a substantially planar monolithic body of electrically conductive material having first and second major surfaces, said sensor comprising:

a frame structure having a length and width formed in said body between said first and second major surfaces;

a first dither mass suspended from the frame structure for vibrating motion within the frame structure in a first direction parallel to the first and second major surfaces;

a first proof mass connected to the first dither mass by a flexure joint for motion in a direction perpendicular to the vibrating motion of the first dither mass about an axis parallel to the motion of the first dither mass;

a second dither mass suspended from the frame structure for vibrating motion with the frame structure in a second direction, parallel to the first and second major surfaces, opposed to the first direction of the first dither mass; and a second proof mass connected to the second dither mass by a flexure joint for motion in a direction perpendicular to the vibrating motion of the second dither mass about an axis parallel to the motion of the second dither mass;

the first and second proof masses being interleaved in a manner that locates the center of percussion of both proof masses at the same point, and the first and second dither masses are shaped and located within the frame structure to place the center of mass for the dither masses on a line parallel to the vibrating motion of both dither masses.

2. The combined sensor of claim 1 wherein said first dither mass comprises an L-shaped member with one leg of the L-shaped member disposed along the length of the frame structure and the other leg of the L-shaped member disposed along the width of the frame structure.

3. The combined sensor of claim 2 wherein said second dither mass comprises an L-shaped member with one leg of the L-shaped member disposed along the length of the frame structure and the other leg of the L-shaped member disposed along the width of the frame structure.

4. The combined sensor of claim 2 further comprising:
a dither coupling spring attached to the frame structure; and
a dither suspension attached to the dither coupling spring and the first dither mass.

5. The combined sensor of claim 4 wherein said dither suspension comprises two spring elements, each spring element connected to the dither coupling spring.

6. The combined sensor of claim 3 further comprising:
a first dither coupling spring attached to the frame structure;
a first dither suspension attached to the first dither coupling spring and the first dither mass;
a second dither coupling spring attached to the frame structure; and
a second dither suspension attached to the second dither coupling spring and the second dither mass.

7. The combined sensor of claim 6 wherein said first dither suspension comprises two spring elements, a first spring element connected to the first dither coupling spring, a second spring element connected to the second dither coupling spring, and both spring elements connected to a leg of the first dither mass.

8. The combined sensor of claim 7 wherein said second dither suspension comprises two spring elements, a first spring element connected to the second dither coupling spring, a second spring element connected to the first dither coupling spring, and both spring elements connected to a leg of the second dither mass.

9. The combined sensor of claim 8 wherein the first spring element of the first dither suspension is connected to the leg of the first dither mass and the second spring element of the first dither suspension is connected to the leg of the second dither mass.

10. The combined sensor of claim 9 wherein the first spring element of the second dither suspension is connected to the leg of the second dither mass, and the second spring element of the second dither suspension is connected to the leg of the first dither mass.

11. The combined sensor of claim 3 wherein the first proof mass is U-shaped and is attached to the first dither mass by a flexure joint.

12. The combined sensor of claim 11 wherein said second proof mass is U-shaped and is attached to the second dither mass by a flexure joint.

13. The combined sensor of claim 12 further comprising:
a dither coupling spring attached to the frame structure; and
a dither suspension attached to the dither coupling spring and the first dither mass.

14. The combined sensor of claim 13 wherein said dither suspension comprises spring elements, each spring element connected to the dither coupling spring.

15. The combined sensor of claim 12 further comprising:
a first dither coupling spring attached to the frame structure;
a first dither suspension attached to the first dither coupling spring and the first dither mass;
a second dither coupling attached to the frame structure; and
a second dither suspension attached to the second dither coupling spring and the second dither mass.

16. The combined sensor of claim 15 wherein said first dither suspension comprises two spring elements, a first spring element connected to the first dither coupling spring, a second spring element connected to the second dither coupling spring, and both spring elements connected to a leg of the first dither mass.

17. The combined sensor of claim 16 wherein said second dither suspension comprises two spring elements, a first spring element connected to the second dither coupling spring, a second spring element connected to the first dither coupling spring, and both spring elements connected to a leg of the second dither mass.

18. The combined sensor of claim 17 wherein the first spring element of the first dither suspension is connected to the leg of the first dither mass and the second spring element of the first dither suspension is connected to the leg of the second dither mass.

19. The combined sensor of claim 18 wherein the first spring element of the second dither suspension is connected to the leg of the second dither mass, and the second spring element of the second dither suspension is connected to the leg of the first dither mass.

20. The combined sensor of claim 19 wherein the first proof mass is attached to the leg of the first dither mass, and the second proof mass is attached to the leg of the second proof mass.

21. The combined sensor of claim 1 further comprising:
a top cover for said sensor, having a top and bottom side, the top cover having electrodes on the bottom side to drive the first and second dither mass, and tuning electrodes to bias the first and second proof mass; and
a bottom cover for said sensor having a top and bottom side, the bottom cover having electrodes on the bottom side to drive the first and second dither mass, and tuning electrodes to bias the first and second proof mass.

22. The combined sensor of claim 21 wherein said top cover further comprises a quadrature error nulling electrode, and said bottom cover further comprises a quadrature error nulling electrode.

23. The combined sensor of claim 21 wherein said top cover further comprises a coriolis forcing electrode, and said bottom cover further comprises a coriolis forcing electrode.

24. The combined sensor of claim 21 wherein the top cover further comprises a plurality of contact pads and feedthru vias on the top side, and the bottom cover further comprises a plurality of contact pads and feedthru vias on the top side.

25. The combined sensor of claim 24 further comprising a first top cover plate overlaying the feedthru vias on the top cover and being sealed thereto, and a second top cover plate overlaying the feedthru vias on the bottom cover and being sealed thereto.

26. The combined sensor of claim 24 further comprising a housing for the sensor, said housing suspending the sensor in a sealed environment by a plurality of compliant mounting pads.

27. The combined sensor of claim 26 wherein the housing further comprises a plurality of feedthru electrical conductors passing through hermetically sealed apertures in walls of the housing.

28. The combined sensor of claim 27 wherein said plurality of feedthru conductors are electrically connected to the plurality of contact pads on the top cover and the bottom cover.

29. The combined sensor of claim 28 wherein the housing further comprises a flange for mounting the housing to a platform.

* * * * *